(No Model.)
W. W. SNOW.
CAR WHEEL.
No. 430,239. Patented June 17, 1890.
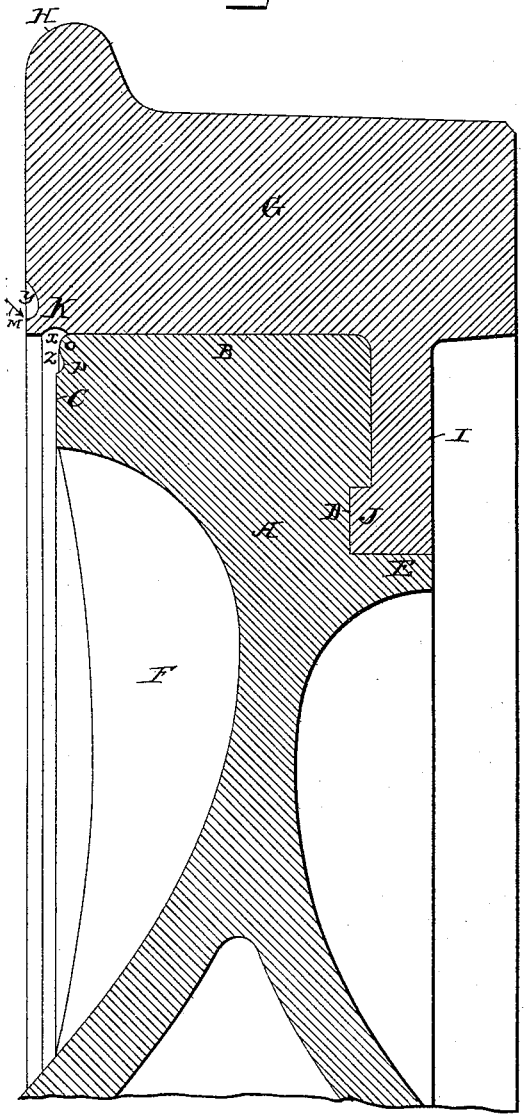
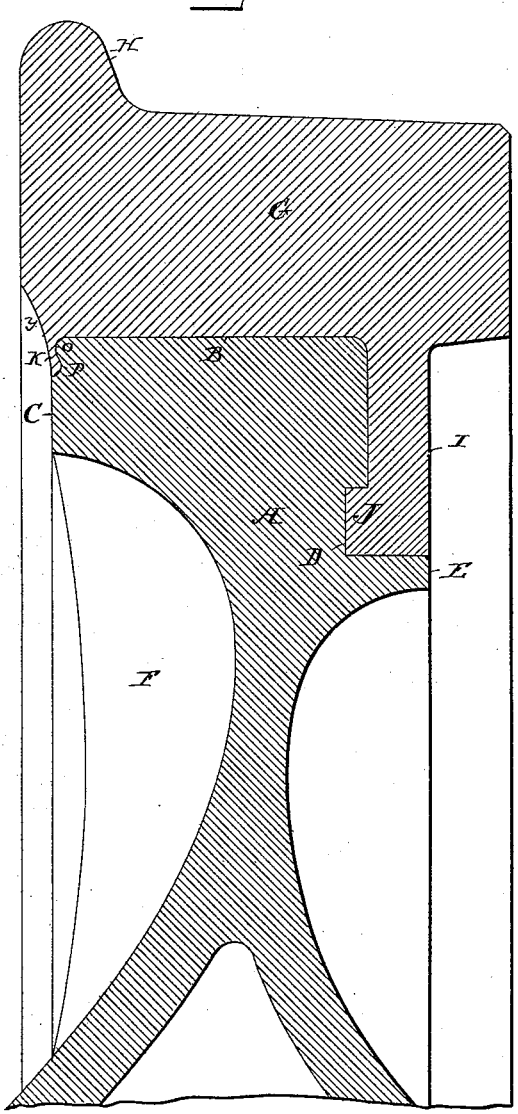
WITNESSES
INVENTOR
William W. Snow
By Foster Freeman
Attorneys

UNITED STATES PATENT OFFICE.

WILLIAM W. SNOW, OF HILLBURN, NEW YORK.

CAR-WHEEL.

SPECIFICATION forming part of Letters Patent No. 430,239, dated June 17, 1890.

Application filed April 29, 1890. Serial No. 349,888. (No model.)

*To all whom it may concern:*

Be it known that I, WILLIAM W. SNOW, a citizen of the United States, residing at Hillburn, Rockland county, State of New York, have invented certain new and useful Improvements in Car-Wheels, of which the following is a specification.

My invention relates to car-wheels, and more especially to that class of car-wheels in which the tires, usually of steel, are made separately and are secured to the body portion of the wheel; and it has for its object to provide means whereby the tire and body portion can be securely fastened together in a cheap, simple, and effective manner, so that if in case of breakage or for other reasons the tire becomes loose or damaged it will not fall off the body portion.

To these ends my invention consists in a wheel, the body portion and tire of which are constructed, arranged, and combined substantially in the manner hereinafter set forth.

Referring to the accompanying drawings, forming part of this application, Figure 1 is a cross-section of so much of a wheel as is necessary to illustrate the construction of the parts, and Fig. 2 is a similar view of a wheel completed and ready for use.

Heretofore it has been common to secure the tire to the body portion of the wheel by means of some locking devices—such, for example, as are illustrated in my prior patent, No. 361,332. It has also been proposed to secure the tire to the body by swaging a projecting sectional flange on the tire down onto the body to secure the two together; but all of these constructions, so far as I am aware, have been open to certain objections which it is the object of my invention to overcome. The body of the wheel A may be variously formed and is preferably made in a single piece, and its outward edge B is practically straight, and the edge of the rim C is arranged at substantially right angles thereto. On the outer side of the body I form a groove D and a projecting rim or flange E, and in order to support the periphery equally and at the same time make the body portion as light as practicable I form brackets or rib-pieces F, extending from near the center of the wheel to and against the projecting portion C of the rim. The tire G is made of suitable width and has the usual running rim or flange H on its inside, and at or near its opposite edge it is provided with an inwardly-extending annular flange I, having a lip J, adapted to fit the groove or recess D, and the inner surface of this flange bears upon the projecting rim or flange E of the body. This feature of construction is shown in my prior patent above referred to, and I have found it exceedingly useful and valuable to support this portion of the flange, as I am enabled to bring the outer surface of the flange I flush with the flange E of the body and secure a firm bearing for the inner surface of the flange and its inwardly-projecting lip. I form the inner edge of the inner side of the tire with a continuous flange K, substantially in the form shown in the accompanying drawings, and when the tire is applied to the body this flange is swaged down upon the inner edge of the body, as shown in Fig. 2. Great difficulty has heretofore been experienced in the practical accomplishment of such a locking means, due to the fact that the swaging of the flange is liable to cause it to crack or otherwise injure the steel and thereby render the wheel unsafe. To avoid such difficulties I form the groove *x* on the inner surface of the tire and form the edge of the body B to correspond therewith by cutting away a portion, as at *z*, and leaving the outline substantially of an ogee contour having a convex rounded portion *o* and a concave rounded portion *p*. I also make a groove *y* on the inside face of the tire, so that the flange K projects between the grooves *x y*. These grooves may be formed in any manner, either in rolling the tire, or, preferably, by turning them after the tire is rolled. When the rim thus provided with a flange is applied to the body portion and properly swaged in position, the material of the projecting flange K will be hammered down so as to practically fill the cut-away portion of the body, leaving the edges of the flange and body substantially parallel.

By making the cut-away portion of the body curved, as set forth, I am enabled to form a secure lock, which will prevent the rim falling off from the body, and this is done without danger of cracking or otherwise injuring the steel of the rim. In swaging this flange I preferably apply the power in the direction of the arrow M, the wheel being supported in a form so as to lie practically at right angles to the direction of the blow, and as this requires but little swaging or displacement of the material to form the lock I can swage it down while the tire is hot and thus cause the tire to be shrunk upon the body of the wheel and the flange swaged with only one heat of the rim. This form of securing the rim to the body is exceedingly simple and inexpensive, and as it avoids any liability to cracking, the strength of the tire is increased, and there being no recesses or grooves in the inner face of the tire it is not weakened, and can therefore be used until it is worn quite thin. Moreover, the appearance of the wheel after being formed this way is enhanced, the rim and body portion apparently forming practically one piece.

What I claim is—

1. The combination, with the body of a car-wheel having a cut-away portion on its inner edge, of a tire having a flange turned down so as to fit said cut-away portion, substantially as described.

2. The combination, with the car-wheel having on its outer side a groove and projection and on its inner side a cut-away portion, of a tire provided with a flange having an inwardly-projecting rib fitting the groove and projection on the outside of the body and having a flange bent down to fit the cut-away portion on the outside of the body, substantially as described.

3. A car-wheel consisting of a body and rim having, respectively, a groove and flange on their outside portions for holding them together, the body being cut away on its inner edge and the rim being provided with a flange fitting said cut-away portion, and the edges of the body and flange being practically parallel, substantially as described.

4. In a car-wheel, the combination, with the body having a projecting flange, and bracket-pieces extending from the center toward said flange, the inward portion of the flange being cut away and the outside portion of the body being provided with a groove and flange, of a rim provided with an internal flange and rib fitting said groove and flange of the body and having a rim filling the cut-away portion of the edge of the body, substantially as described.

In testimony whereof I have signed my name to this specification in the presence of two subscribing witnesses.

WILLIAM W. SNOW.

Witnesses:
F. WILLIAM SNOW,
FRED. W. SNOW.